(12) United States Patent
Schottenloher

(10) Patent No.: US 9,095,906 B2
(45) Date of Patent: Aug. 4, 2015

(54) WORKPIECE PRODUCED FROM AN ELONGATED BLANK OR INTERMEDIATE PRODUCT AND METHOD FOR THE PRODUCTION THEREOF

(71) Applicant: Hirschvogel Umformtechnik GmbH, Denklingen (DE)

(72) Inventor: Michael Schottenloher, Kaufbeuren (DE)

(73) Assignee: HIRSCHVOGEL UMFORMTECHNIK GMBH, Denklingen (DE)

( * ) Notice: Subject to any disclaimer, the term of this patent is extended or adjusted under 35 U.S.C. 154(b) by 259 days.

(21) Appl. No.: 13/728,249

(22) Filed: Dec. 27, 2012

(65) Prior Publication Data

US 2013/0216853 A1    Aug. 22, 2013

(30) Foreign Application Priority Data

Jan. 12, 2012   (DE) .......................... 10 2012 200 395

(51) Int. Cl.
*B23B 1/00* (2006.01)
*B21J 5/12* (2006.01)

(52) U.S. Cl.
CPC ... *B23B 1/00* (2013.01); *B21J 5/12* (2013.01); *Y10T 82/10* (2015.01); *Y10T 82/2568* (2015.01); *Y10T 428/12389* (2015.01)

(58) Field of Classification Search
CPC .......................... Y10T 82/2571; Y10T 82/2568
See application file for complete search history.

(56) References Cited

U.S. PATENT DOCUMENTS

| 3,195,221 | A | | 7/1965 | Martin et al. |
| 3,910,097 | A | | 10/1975 | Kubalek |
| 4,357,137 | A | * | 11/1982 | Brown ............................ 464/75 |
| 6,059,378 | A | * | 5/2000 | Dougherty et al. ........ 301/124.1 |

FOREIGN PATENT DOCUMENTS

| CH | 518775 A | 2/1972 |
| CH | 562655 A5 | 6/1975 |
| DE | 31492 A | 9/1964 |

OTHER PUBLICATIONS

Hoffman et al., "Precision Machining Technology", Unit 2, Workholding and Toolholding Devices for the Lathe, 2012, p. 377.

* cited by examiner

*Primary Examiner* — Adam Krupicka
(74) *Attorney, Agent, or Firm* — Marshall, Gerstein & Borun LLP

(57) ABSTRACT

A method for producing a workpiece from an elongated blank or intermediate product. The workpiece geometry is formed in a first method step, for example by forging the blank or intermediate product, a centering region for subsequent machining of the workpiece between centers being introduced in two oppositely situated sides of the workpiece with reference to the longitudinal axis thereof, and at least one of the centering regions having a desired deformation face. The workpiece is calibrated in a second method step, the desired deformation face being adapted in such a manner that the distance between the contact faces of the centering regions for the machining between centers being adjusted to a predetermined desired measurement. The invention also includes a corresponding workpiece with centering regions, at least one of which has at least one desired deformation face.

33 Claims, 6 Drawing Sheets

WORKPIECE PRODUCED FROM AN ELONGATED BLANK OR INTERMEDIATE PRODUCT AND METHOD FOR THE PRODUCTION THEREOF

BACKGROUND OF THE INVENTION

1. Field of the Invention

The invention relates to a method for producing a workpiece with centering regions or centers for machining between centers, said workpiece being produced from an elongated blank or intermediate product, as well as to a workpiece with corresponding centering regions.

2. Related Technology

It is known from the prior art to clamp elongated components for machining between centers in order to be able to machine said components over the entire surface, in particular when machining in lathes, in order to avoid machining defects or in order to make it possible to machine/turn in both directions. To this end, centers are provided in the workpiece to be machined at two oppositely situated (when viewed in the longitudinal direction of the workpiece) (end) faces; preferably cone-shaped centers. A driven tip of a lathe is introduced into the center on one side of the workpiece and an entrained tip of a lathe is introduced into the oppositely situated center and the workpiece is clamped at its oppositely situated (end) faces in this manner. On the machine side, the driven tip is clamped in the operating spindle of the lathe, whilst the entrained tip is clamped in the tailstock of the same.

During machining (turning, grinding etc.) between centers, it is necessary for the length tolerance between the contact faces of the centers or other types of centering regions to be as small as possible in order to make uniform finishing possible over several workpieces. Thus, for example, when providing toothing in a workpiece by means of machining between centers, the toothing can extend too far or not far enough in the longitudinal direction of the workpiece and can consequently impair other geometric contours of the workpiece or the region of the engagement of the toothing.

In addition, for the purchaser of prefabricated workpieces (for example blanks for constant velocity drive shafts) who wants to machine them further or finish them by machining between centers, it is, as a rule, very time-consuming and very costly to provide centers subsequently in the workpiece, for example through metal-cutting methods such as drilling.

On the part of the supplier and manufacturer of the prefabricated workpiece, the centers are generally able to be introduced at the same time directly during the manufacture of the workpiece. For example, when workpieces are produced by means of cold-forging, warm-forging or hot-forging (e.g. hot extrusion), length tolerances of the workpiece of approximately +/−2 mm are achieved. In the case of the workpiece produced by forging a blank or intermediate product, this means that during forging centers that were introduced at the same time—or better the actual measurement of the distance between the contact faces of the centers or other types of centering regions for the machining between centers—also lie in a high tolerance range, it only being possible to achieve minimum tolerances of +/−0.6 to +/−0.8 mm. If a workpiece of this type is further machined on the part of the purchaser, the tolerance per workpiece has to be determined individually in order to balance it out during machining. This, in turn, requires a high amount of expenditure of measuring and subsequently an individual adjustment of the machine for each workpiece, which means a high level of expenditure of time and money and makes automatic production almost impossible; at best in the case of workpieces with small tolerance defaults.

As an alternative to this, it is also possible, in a further method step, to compress the entire workpiece after production thereof and after the introduction of centers, however, as a rule, before further machine-cutting, which requires a high level of expenditure on labor, energy and costs. In addition, the compressing impairs the geometry of the workpiece over the entire workpiece length, which increases the risk of scrap.

SUMMARY OF THE INVENTION

It is, consequently, an object of the invention to provide a workpiece from an elongated blank or intermediate product with a small length tolerance as well as a simple method for producing the same.

According to a first aspect of the invention, a method is provided for producing a workpiece from an elongated blank or intermediate product. The workpiece geometry is formed in a first method step, for example by forging the blank or intermediate product, wherein a centering region for a subsequent machining of the workpiece between centers is introduced in each of two oppositely situated sides of the workpiece with reference to the longitudinal axis thereof, and wherein at least one of the centering regions has a desired deformation face. The workpiece is calibrated in a second method step, wherein the desired deformation face is adapted in such a manner that the distance between the contact faces of the centering regions for the machining between centers is adjusted to a predetermined desired measurement.

Through the provision of desired deformation faces, a face that is small in relation to the workpiece or the centering region is provided. A subsequent deformation of said small face requires a small amount of energy to be expended and consequently little machine use such that, for example, it is possible to use small presses to adapt the length tolerance between the contact faces of the centering regions of the workpiece. Compared to compressing the entire workpiece, the deformation of the comparatively small desired deformation face has no influence on the overall geometry of the workpiece. It is consequently possible by means of the calibrating operation to adapt, in a precise manner, the length tolerance between the centering regions, that is the tolerance of the distance between the contact faces of the centering regions for the machining between centers, to a value of approximately +/−0.25 mm, preferably of +/−0.1 mm (or less); which lies clearly below the minimum tolerances of the methods known up to now for introducing centering regions during the production of the workpiece. Consequently, workpieces which could only be produced and supplied in an economically useful manner for the manufacturer and supplier up to now without centering regions, can now be pressed and supplied also with a centering region, it being possible, in particular, to meet the high demands for (length) tolerance values of the workpieces at the same time. This, in turn, leads to a high cost saving on the part of the purchaser of the workpieces as he no longer has to provide the centering regions subsequently by machine or balance out the tolerances. The expenditure on labor on the part of the manufacturer of the workpieces, in this case, is only increased minimally as the desired deformation faces are introduced at the same time directly with the pressing of the workpieces and the subsequent calibrating operation can be carried out using small presses or presses with a low level of pressing force. Consequently, the expenditure on labor and costs is reduced overall.

At least one of the centering regions can be or have a center, which, in turn, can preferably have a cone-shaped recess, wherein the outer surface of the cone-shaped recess preferably encloses an angle of 60°. At least one of the centering regions can also be formed by inner wall regions of the workpiece which taper toward the respective other centering region or by parts thereof, wherein the inner wall regions preferably enclose an angle of 60°, that is preferably of 30° in each case with respect to/with the longitudinal axis of the workpiece. In other words, the centering regions are not limited to a certain geometric development as long as they enable the development of desired deformation faces according to the invention and allow the workpiece to be centered during the machining between centers.

The desired deformation face is preferably formed in such a manner that it extends right into the centering region or the center as a three-dimensional shaped elevation. To this end, the three-dimensional shaped elevation can have at least three convex and preferably point-focal or elongated shaped elevations which are preferably arranged distributed uniformly over the circumference of the centering region, such as, for example, hemispherical or cone-shaped shaped elevations. As an alternative to this or in addition to it, the three-dimensional shaped elevation can also have at least one preferably substantially ring-shaped or hose-shaped shaped elevation which extends over at least part of the circumference of the centering region. Consequently, it is possible to provide a desired deformation face using the methods previously known for forming the workpiece geometry (forging methods in particular) in a centering region (such as for example a center) without incorporating additional method steps into the production process. All that is necessary is a one-time adaptation of the ram geometry used up to now. When the three-dimensional desired deformation face is used, the calibrating operation can also be carried out in a simple manner by means of a small additional machine use in order to adapt a length tolerance between the contact faces of the centering regions for the machining between centers to a predetermined desired measurement.

To this end, the desired deformation face is forged or reduced in such a manner during the calibrating operation that the distance between the contact faces of the centering regions for the machining between centers is reduced to the predetermined desired measurement. The provision of additional desired deformation faces consequently enables an adaptation/calibration of the contact faces of the centering regions by means of simple use of methods already known; such as, for example, forging methods or machine-cutting methods. As, in addition, only the desired deformation faces have to be adapted, the use of corresponding machines can be kept low, which, in turn, signifies a comparably small amount of expenditure in time and money. The calibrating operation can also be carried out in an automated manner as the calibrating tools can be preset to the predetermined desired measurement.

During the calibrating operation, the desired deformation face is preferably forged by introducing a calibrating tool which corresponds substantially to the centering region except for the desired deformation face. For calibrating the workpiece, the calibrating tool, in turn, is preferably introduced into the centering region in the longitudinal direction of the workpiece. In a fixed end position of the calibrating tool during the calibrating operation, the distance between the contact faces of the centering regions of the workpiece for the machining between centers preferably corresponds to the predetermined desired measurement. In a particularly preferred manner, two calibrating tools corresponding with the centering regions are introduced into the centering regions in the longitudinal direction of the workpiece and are moved in such a manner in relation to each other that the distance between the calibrating tools in a fixed end position during the calibrating operation corresponds to the desired measurement of the distance between the contact faces of the centering regions of the workpiece for the machining between centers. In the aforesaid manner, a simple machine and a simple method are provided which, always with the same setting of the machine, that is with a fixed end position of the tools during the calibrating operation corresponding to the predetermined desired measurement, without exception supply constant results within the small tolerance range; this additionally independently of the length fluctuations brought about by the forging process over the entire length of the workpiece.

In a particularly advantageous manner, the step for forming the workpiece geometry has at least one cold-forging, warm-forging or hot-forging step. Likewise in a particularly advantageous manner, the step for calibrating has at least one cold-forging, warm-forging or hot-forging step. However, it is also conceivable for the step for calibrating to include a machine-cutting method, for example drilling; the calibrating tool, in this case, is the drill, the wear of which, as a result of the small face to be machined with reference to the entire face of the centering region, is clearly reduced with respect to a case where the entire centering region (for example center) is produced by means of machine-cutting methods. The forging and calibrating of the workpiece occurs consequently in few steps and uses methods already known and machines already present.

According to a further aspect of the invention, a workpiece produced from an elongated blank or intermediate product is provided, wherein the workpiece has a centering region for machining between centers on each of two oppositely situated sides with reference to the longitudinal axis of the workpiece. At least one of the centering regions has according to the invention at least one desired deformation face.

By providing a desired deformation face in at least one centering region, a workpiece is provided which has a region which is easily deformed just in the centering regions in order, irrespective of a length fluctuation of the workpiece brought about by the forging process, to generate the distance between the contact faces of the centering regions for machining between centers within a small tolerance range and in a simple and energy-saving manner.

At least one of the centering regions can be or have a center, which, in turn, preferably has a cone-shaped recess. This makes it possible to use known (lathe) centers in order to clamp and machine the workpiece between centers. In a particularly preferred manner, the outer surface of the cone-shaped recess encloses an angle of 60° (60° cone), which corresponds to the geometry of the (lathe) centers usually used. Standard centers suitable for many customers can be provided in this way. At least one of the centering regions can also be formed by inner wall regions of the workpiece which taper toward the respective other centering region or by parts thereof, wherein the inner wall regions preferably enclose an angle of 60°, that is preferably of 30° in each case with respect to/with the longitudinal axis of the workpiece. In other words, the centering regions are not limited to certain geometric developments as long as they make the development of desired deformation faces according to the invention possible and allow the workpiece to be centered during the machining between centers.

The desired deformation face has preferably at least one three-dimensional shaped elevation which extends right into the centering region or the center. In this case, the three-dimensional shaped elevation can have, for example, at least three convex and preferably point-focal or elongated shaped elevations which are preferably arranged distributed uniformly over the circumference of the centering region, such as, for example, hemispherical or cone-shaped shaped elevations. As an alternative to this or in addition to it, the three-dimensional shaped elevation can have at least one preferably substantially ring-shaped or hose-shaped shaped elevation which extends over at least part of the circumference of the centering region. The decisive factor is that the three-dimensional shaped elevation has, compared to the workpiece and centering region, a comparatively small support or contact face, surface or contour. Consequently, it is preferably made possible for the desired deformation face to be easily deformed (that is compressed in the direction of the longitudinal axis of the workpiece) without influencing the geometry of the workpiece further or compressing the workpiece in its entirety at all. In addition, the afore-described development forms of a three-dimensional shaped elevation form a sufficient contact face both for the calibrating tool and for the (lathe) centers for the machining between centers. In addition, the shaped elevation also provides a centering of the tools in the centering region itself. In this way it is achieved that the centering regions are aligned with each other and the workpiece consequently does not become conical during the machining between centers.

BRIEF DESCRIPTION OF THE DRAWINGS

Further developments and advantages of the invention are described below by way of exemplary embodiments and by means of the Figures of the accompanying drawings.

DETAILED DESCRIPTION

FIGS. 1 to 4 show in each case a part view of a workpiece 1 according to the invention. To simplify the representation, just one sectioned end side of the preferably round workpiece 1 is shown.

The workpiece 1 is produced from an elongated blank or intermediate product and is preferably formed from a metal or a metal alloy. The geometry and dimension of the cross sectional area of the workpiece 1 and of the modification thereof in geometry and dimension when viewed over its longitudinal axis L is not restricted by the invention. In order to form or produce the workpiece 1 from the blank or intermediate product, said blank or intermediate product is preferably forged by means of forging methods. In a particularly preferable manner, the workpiece geometry is formed by means of cold-forging, warm-forging or hot-forging methods. Presses with rams known from the prior art are used for this purpose. The method for producing the workpiece 1 according to the invention is described again further within the framework of the application.

Figure 1:
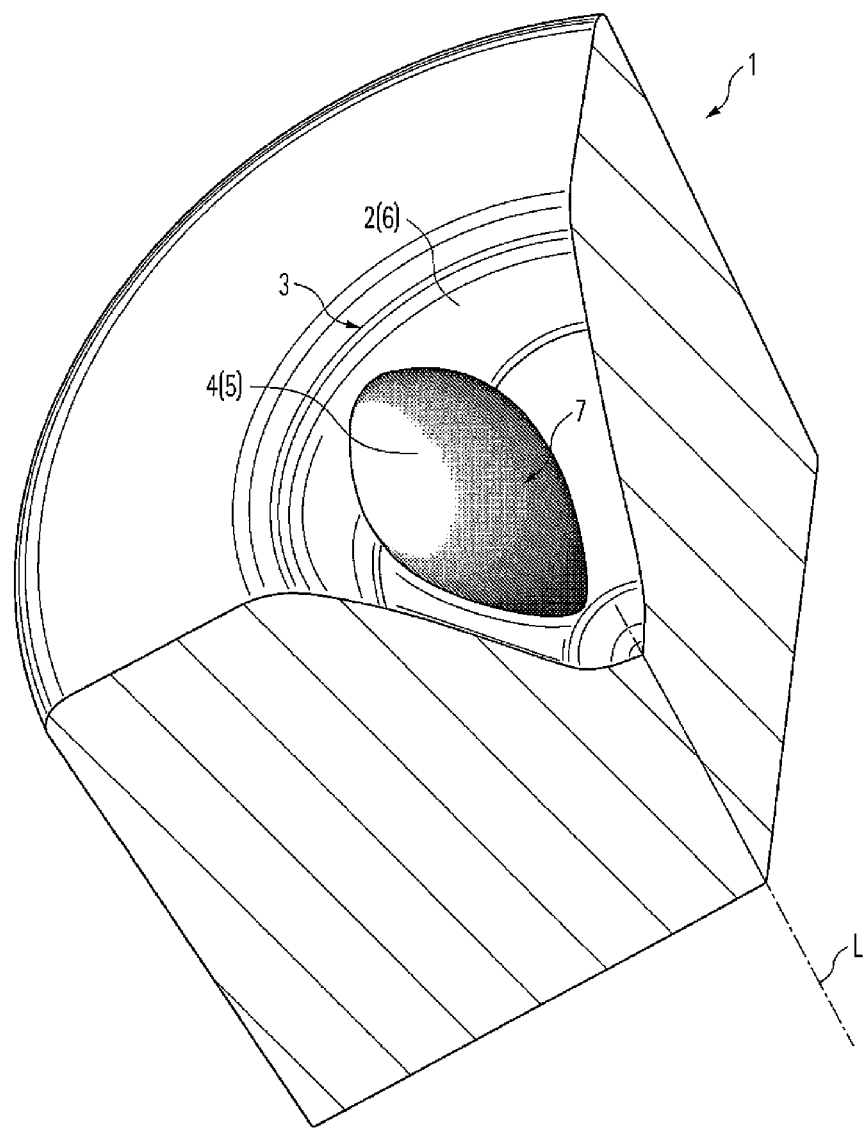
FIG. 1 shows a part view of a workpiece according to the invention with a centering region in the form of a center and a desired deformation face after the forming of the workpiece geometry and before a calibrating operation by means of the finite element method (FEM)
Figure 2:
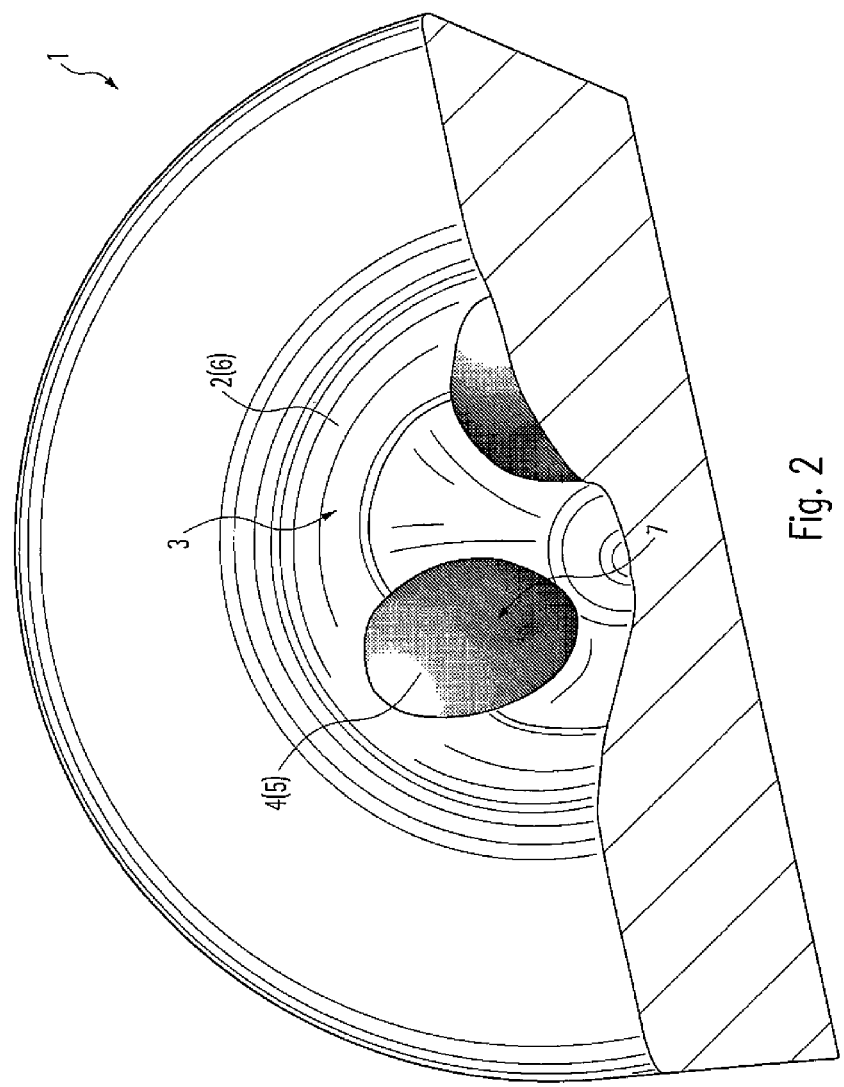
FIG. 2 shows a part view of a workpiece according to the invention with a centering region and a desired deformation face at the start of a calibrating operation.
Figure 3:
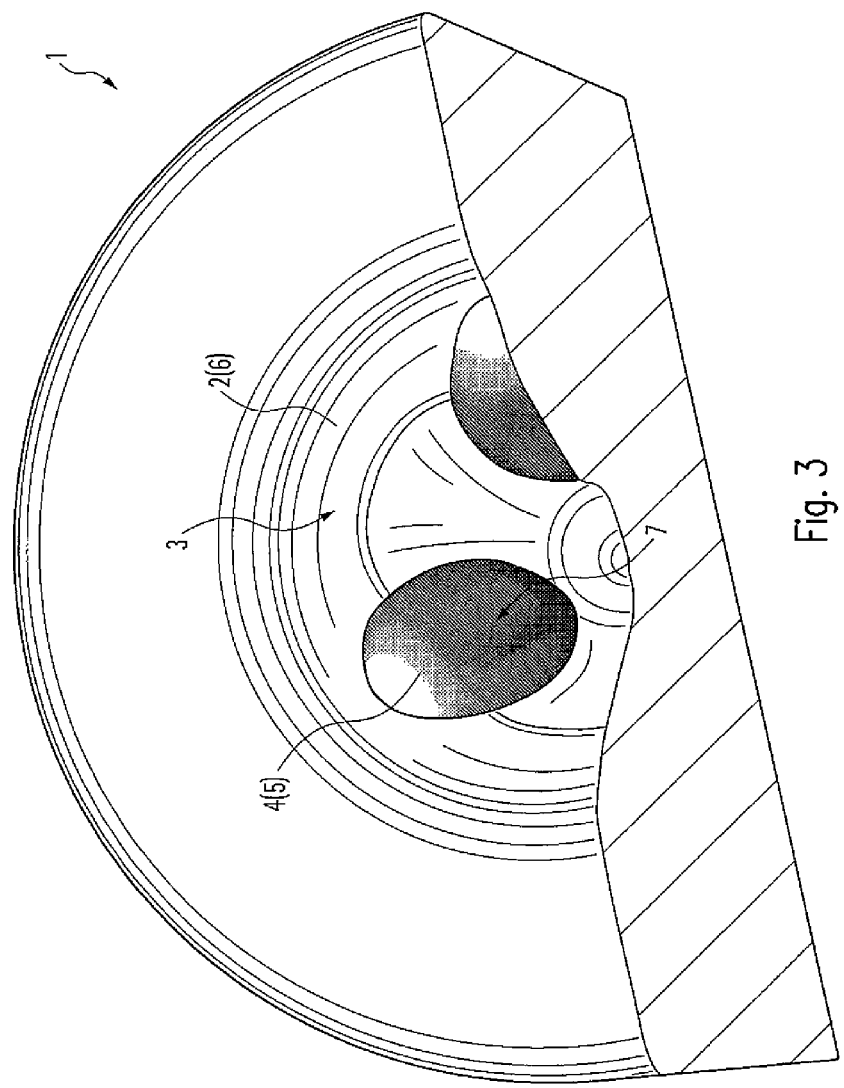
FIG. 3 shows a part view of a workpiece according to the invention with a centering region and a lightly calibrated desired deformation face.
Figure 4:
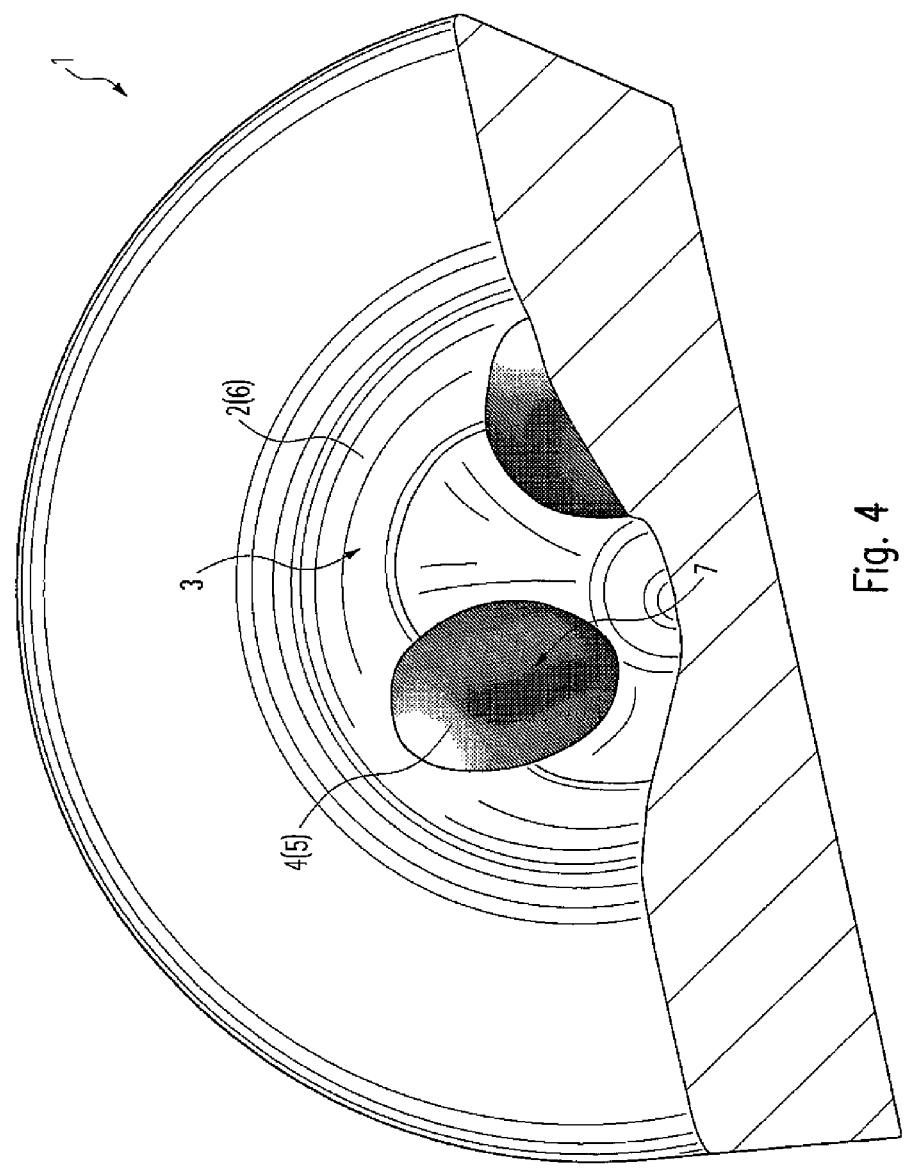
FIG. 4 shows a part view of a workpiece according to the invention with a centering region and a heavily calibrated desired deformation face.

So that the workpiece 1 can be machined between centers, it has, on two oppositely situated sides with reference to the longitudinal axis L of the workpiece 1, centering regions 2 of which just one centering region 2 is shown in the part sectional view in FIG. 1 and additionally half of one further centering region 2 is shown in the part sectional views in FIGS. 2 to 4. The term oppositely situated sides within the context of the invention not only refers to end-face sides or end faces (that is end sides) of the workpiece 1, but, when viewed in the longitudinal direction, all sides or side regions of the workpiece which are aligned substantially parallel with respect to each other and are spaced apart from each other. Along with end faces realized in an orthogonal manner with respect to the longitudinal axis, the term—oppositely situated sides or side regions—therefore also includes, for example, stepped inner regions of a recess of the workpiece which have a face which extends in a substantially orthogonal manner with respect to the longitudinal axis. Preferably therefore all faces which are spaced apart from each other, lie substantially in a plane which is orthogonal with respect to the longitudinal axis and enable two-sided accommodation of a (lathe) center for machining between centers.

As a result, the centering region 2 can be realized either as a center, as shown in FIGS. 1 to 4 and consequently preferably have a cone-shaped recess 3. In said case, the outer surface 6 (also called centering base face) of the cone-shaped recess 3 preferably encloses an angle of 60° (but any other number of degrees is also conceivable), which as a rule corresponds to the cone angle of the (lathe) centers of a lathe, between which the workpiece 1 is clamped for finishing (machining between centers). However, it is also conceivable for at least one of the centering regions 2 to be formed at least by inner wall regions of the workpiece 1 which taper toward the respective other centering region 2 or by parts thereof, the inner wall regions in this case also preferably enclosing an angle of 60° (that is preferably of 30° in each case with respect to/with the longitudinal axis L of the workpiece 1). The development of the centering regions 2, however, is not limited by the invention as long as the centering regions 2 enable a desired centering of the workpiece 1 when said workpiece is clamped between the centers for example of a lathe. This can be achieved in general, for example, by at least three substantially point-focal, supporting (part) regions of the workpiece inner wall which extend at least over more than half of the circumference of the workpiece 1. Said (part) regions ought preferably to be realized in such a manner that they can be connected as a cone at least in an imaginary manner such that the centering region 2 enables the accommodation of a (lathe) center of a machine for the machining between centers.

So that length tolerances, already economically sensible on the part of the manufacturer of the workpiece 1, in particular between the contact faces of the centering regions 2 can be adjusted to a desired measurement for the machining between centers, such that the workpiece 1 is able to be processed further without additional machining or balancing out of length fluctuations on the part of the purchaser, at least one of the centering regions 2 has at least one desired deformation face 4.

The desired deformation face 4 is to be realized in such a manner that the distance between the contact faces of the centering regions 2 can be adjusted in a simple manner to a predetermined desired measurement for the machining between centers without, in this case, compressing the workpiece 1 over its entire length. To this end, the desired deformation face 4 preferably has at least one three-dimensional shaped elevation which extends right into the centering region or the center 2. This can be seen clearly as an example in FIGS. 1 to 4.

The desired deformation face 4 or three-dimensional shaped elevation is realized in such a manner that it presents a sufficient support surface for the (lathe) centers for machining between centers and, in this case, makes it possible at the same time to center the workpiece 1. In this regard, the invention is not limited to a special development of the desired deformation face 4 as long as said desired deformation face takes the aforementioned defaults into account.

In a preferred development form, the three-dimensional shaped elevation has at least three convex and preferably point-focal shaped elevations 5 which are arranged distributed over the circumference of the centering regions 2, as is shown, for example, in FIGS. 1 to 4. In order to achieve particularly precise centering, the three or more convex shaped elevations 5 ought preferably to be arranged distributed uniformly over the circumference of the centering region 2. The term "point-focal" within the framework of the invention does not refer to a microscopically small region, but rather is to paraphrase the fact that the desired deformation face 4 extends in a comparatively small region with reference to the overall dimension of the workpiece 1 or centering region 2 or is realized at least around a point on the outer surface 6 of the centering region 2 and extends from said point right into the centering region or the center 2; preferably with a rotationally symmetrical or mirror-symmetrical form. A convex and point-focal shaped elevation 5 can have, for example, a substantially semi-spherical or cone-shaped shaped elevation, as shown in FIGS. 1 to 4. However, it is also conceivable for the shaped elevation 5 to have another geometric form; for example with an angular or oval base surface. The shaped elevation 5 can also be realized in an elongated manner and can extend, for example, from the foot of the centering region 2 toward the opening thereof.

In an alternative development form, the three-dimensional shaped elevation has, as an alternative or in addition to the aforementioned development form, at least one shaped elevation (not shown) which extends over at least part of the circumference of the centering region 2 (that is in particular along a plane which is substantially orthogonal to the longitudinal axis L). This can preferably be realized in a substantially ring-shaped or hose-shaped manner and can extend, for example, with the realization of only one or two shaped elevations, preferably in total over at least more than half of the circumference of the centering region 2; if the ring-shaped or hose-shaped shaped elevation consists of more than two part regions, then they ought to be arranged in such a manner that they enable a supporting and centering of a (lathe) center; that is realized in particular substantially uniformly over the circumference of the centering region 2 along the outer surface 6 thereof.

The desired deformation face 4 or three-dimensional shaped elevation should preferably extend, irrespective of its geometric development, only to a comparatively small extent in the longitudinal direction L of the workpiece 1 in order to enable a compressing or reducing of the same, described below, in precisely said longitudinal direction L with as small as possible expenditure on energy and pressing or using as few machines and tools as possible.

A method according to the invention for producing a workpiece 1 from an elongated blank or intermediate product is to be described below.

The workpiece geometry is formed in a first step. For this purpose forging methods are preferably used including at least one cold-forging, warm-forging or hot-forging step. The forging of an elongated blank/intermediate product by means of forging methods is adequately known from the prior art and consequently is not to be described further at this point.

When forming the workpiece 1 or forging the elongated blank or intermediate product, a centering region 2 for subsequent machining of the workpiece 1 between centers is introduced (at the same time) in each of two oppositely situated (end) sides of the workpiece 1 with reference to the longitudinal axis L thereof. The centering regions 2, in this case, can have different geometric developments and dimensions, however common to all of them is that they taper when viewed in the longitudinal direction L of the workpiece 1 and in the direction of the respective other centering region 2. The centering regions 2, in this case, are preferably realized in each case in such a manner that the outer surfaces 6 thereof enclose an angle of 60°, for example in the form of a cone, as shown in FIGS. 1 to 4.

In the case of the first step of the method according to the invention, that is the forming of the workpiece geometry from the blank or intermediate product, the centering regions 2 are introduced into the workpiece 1 in such a manner that subsequently at least one of the centering regions 2 has a desired deformation face 4. The desired deformation face 4 is preferably formed in such a manner that it extends as a three-dimensional shaped elevation 5 right into the centering region or the center 2. Said three-dimensional shaped elevation 5, according to a first embodiment, preferably has at least three convex and preferably point-focal or elongated shaped elevations 5 which are preferably arranged distributed over the circumference of the center 2; for example in the form of semi-spheres or cones. As an alternative or in addition to this, the three-dimensional shaped elevation can also have at least one preferably substantially ring-shaped or hose-shaped shaped elevation which extends over at least part of the circumference of the centering region 2.

Figure 5:
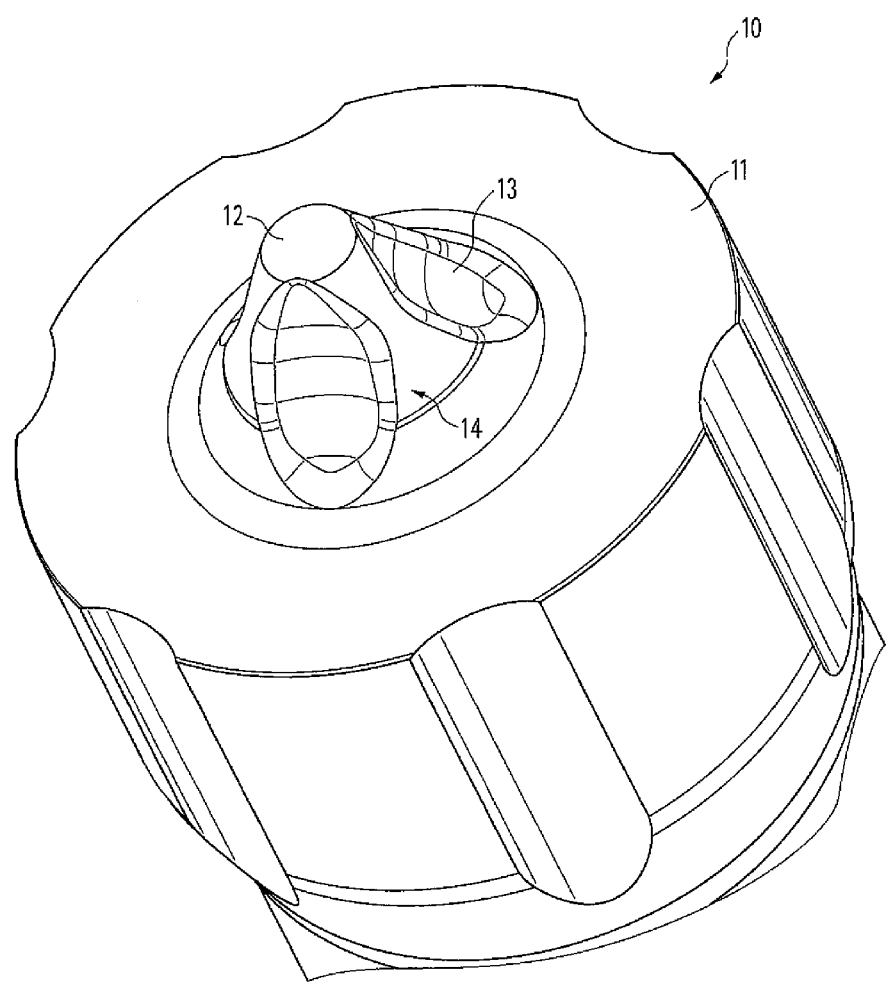
FIG. 5 shows a forging tool (ram) for the production of the centering region according to the invention with a desired deformation face and FIG. 6 shows a calibrating tool for the calibration of the workpiece according to the invention.

FIG. 5 shows as an example a forging tool 10 in the form of a ram, as can be used in a press for producing a centering region 2 with a desired deformation face 4 in a workpiece 1 according to the invention. The tool 10 has a center shaping region 12 which is raised from a preferably planar end face 11; preferably in the form of a cone, in particular a 60° cone. However, it is also conceivable for the center shaping region 12 of the tool 10 to have other geometric developments for forming a centering region 2 in a workpiece 1, as long as the centering region 2 enables a clamping and centering of the workpiece 1 in a machine for machining between centers. The centering region 2 should preferably be formed as a cone or the part regions of the centering region 2 should be able to be connected as a cone, at least in an imaginary manner, such that the centering region 2 enables the accommodation of a (lathe) center of a machine for the machining between centers. The outer surface 14 of the center shaping region 12 corresponds substantially to the outer surface 6 of the centering region 2.

Recesses 13 are additionally provided in the outer surface 14 of the tool 10 in the preferably cone-shaped center shaping region 12 in FIG. 5 or in at least one (part) of the (part) regions of the tool 10 forming the centering region 2. The number of recesses 13 corresponds to the number of desired deformation faces 4 to be formed. The recesses 13 correspond additionally in their form to a negative image of the desired deformation faces 4 to be formed. When forming the workpiece geometry (that is preferably when forging the blank or intermediate product), the centering regions 2 are introduced into the workpiece 1 by means of the center shaping region 12 in the form of a cone or a comparable tool face, the geometric development of the recesses 13 forming three-dimensional shaped elevations 5 in the workpiece 1 which extend right into the centering region or the center 2.

Once the workpiece geometry has been formed in the first method step, there are length differences in the workpieces 1, brought about by the method, within a tolerance range of +/−2 mm with respect to the predetermined desired measurements. The length tolerance of the distance between the contact faces of the oppositely situated centering regions 2 of a workpiece 1 for the machining between centers, in this case, still lies within a range of between +/−0.6 mm and +/−0.8 mm. In order to reduce said tolerance range, preferably to an accuracy of +/−0.25 mm, in a particularly preferred manner to +/−0.1 mm or less, the workpiece 1 is calibrated in a second step of the method according to the invention.

The desired deformation face 4 is adapted by the calibrating operation in such a manner that the distance between the contact faces of the centering regions 2 for the machining between centers is adjusted to a predetermined desired measurement. To this end, the desired deformation face 4 is preferably forged or reduced in such a manner that the distance between the contact faces of the centering regions 2 for the machining between centers is reduced to the predetermined desired measurement. This can occur either by means of a renewed forging operation, the desired deformation face 4 just being forged. Said forging operation can, in turn, have at least one cold-forging, warm-forging or hot-forging step. However, it is also conceivable for the desired deformation face 4 to be adjusted to the predetermined desired measurement in another manner; for example by means of machine-cutting methods such as drilling, material just having to be removed from the desired deformation face 4. Consequently, to calibrate the entire workpiece 1, only the comparatively small desired deformation face 4 has to be adapted, which results in a considerable simplification of the method and only requires the use of smaller machines which are already adequately known.

In order to adjust the desired deformation face 4 during the calibrating operation by forging or also by means of machine-cutting methods, a forging tool or calibrating tool 20, which corresponds substantially with the centering region 2 except for the desired deformation face 4, can be introduced into the centering region 2 of the workpiece 1. The term "corresponds substantially with the centering region 2 except for the desired deformation face 4" is to refer within the framework of the invention to the fact that the geometric form (the outer surface 23) of the calibrating tool 20 in a center calibrating region 22 corresponds to a negative image (of the outer surface 6) of the centering region 2 without the desired deformation face 4; that is preferably a cone, in a particularly preferable manner a 60° cone (cf. FIG. 6).

Figure 6:
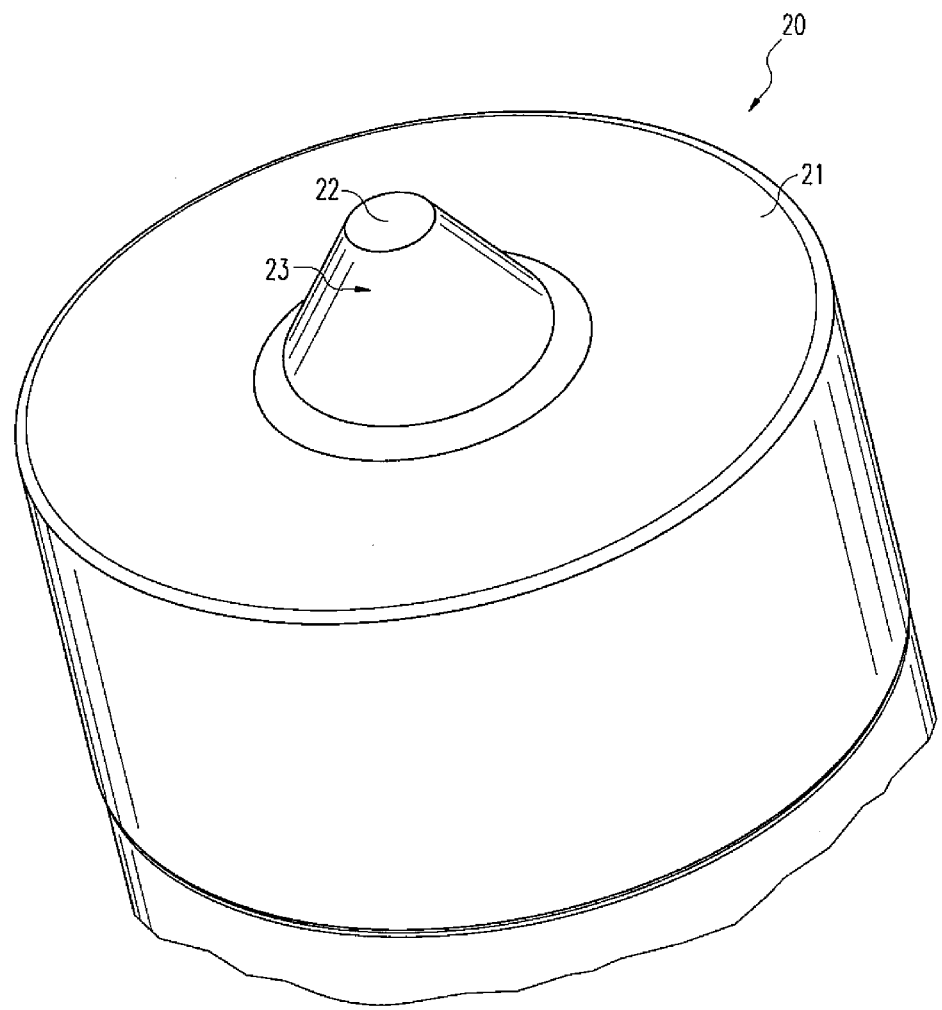

FIG. 6 shows a calibrating tool 20 as an example. It has, similar to the forging tool 10 for forming the workpiece geometry or the centering region 2, the center calibrating region 22 which extends from a preferably planar end face 21. Said center calibrating region has, as described beforehand, preferably a conical form (for example a 60° cone). It is obvious that, similar to the forging tool 10, other developments of elevations are also conceivable as long as the basic form of the same corresponds to that of the forging tool 10 except for the recesses 13. As the tool 20 for the calibrating operation essentially has the form of the forging tool 10 without the recesses 13 for the desired deformation face 4, on account of the missing recesses 13 in the calibrating tool 20 the desired deformation face 4 can be forged and consequently adapted when introducing the calibrating tool 20, in particular the center calibrating region 22, into the centering region 2. To this end, the calibrating tool 20 preferably moves into the centering region 2 in the longitudinal direction L of the workpiece 1 in order, consequently, to adjust the distance between the contact faces in the longitudinal direction L in a simple manner to the predetermined desired measurement.

It must be noted that the center calibrating region 22 can also be realized by the tip of a drill as a calibrating tool which, by moving into the centering region 2, reduces the desired deformation face 4 when viewed in the longitudinal direction L of the workpiece 1.

In a preferred embodiment, in a fixed end position of the calibrating tool 20 during the calibrating operation, the distance between the contact faces of the centering regions 2 of the workpiece 1 for the machining between centers corresponds to the predetermined desired measurement. In other words, the development according to the invention makes it possible for the calibrating tool 20 to move into the same end position in the case of each workpiece 1 independently of the large tolerance range brought about by the production process when forming the workpiece geometry. Said end position is designed such that it corresponds to the aforementioned desired measurement on the part of the workpiece 1. The desired deformation face 4, depending on the manufacturing tolerance, is consequently only forged or reduced so much as is necessary for achieving the desired measurement of the distance between the contact faces of the centering regions 2 for the machining between centers; this is without determining the actual measurement of said distance individually and without adjusting the fixed end position. Consequently, the calibrating operation can also be carried out in a fully automatic manner; with constantly identically good results.

In a particularly preferred embodiment, preferably two calibrating tools 20 corresponding with the centering regions 2 are introduced into the oppositely situated centering regions 2 of a workpiece 1 and in the longitudinal direction L of the workpiece 1 and are moved in such a manner in relation to each other (that is toward each other) that the distance between the calibrating tools 20 in a fixed end position during the calibrating operation corresponds to the desired measurement of the distance between the contact faces of the centering regions 2 of the workpiece 1 for the machining between centers. Irrespective of whether only one or both centering regions 2 have desired deformation faces 4, a simple method is consequently provided, by way of which calibration results that are always the same and are used for different workpieces are able to be achieved. As the calibrating tools 20 just forge the desired deformation faces 4, compression of the entire workpiece 1 is reliably avoided, whilst at the same time the distance between the contact faces of the centering regions 2 is adjusted to a predetermined desired measurement.

The term contact face within the framework of the invention is understood and designated as that face of a centering region 2 at which, during machining between centers, the (lathe) centers engage in the centering region 2 and clamp the workpiece 1. If desired deformation faces 4 are provided in a centering region 2, said contact face is thus formed by the face 7 facing the centering region 2 (that is the face 7 remote from the outside surface 6 of the centering region 2) which, as a rule, is forged/reduced during the calibrating operation and is adapted to the contour of the centering region or the center contour. In the case of centering regions 2 without a desired deformation face 4, the contact face, as a rule, is formed by the centering base face or outside surface 6 of the centering region 2.

FIG. 1 shows a cutout of a centering region 2 of a workpiece 1 after forming the workpiece geometry and before a calibrating operation. In FIG. 1, the convex, point-focal or slightly elongated, three-dimensional shaped elevation 5 as a desired deformation face 4 can be seen in the state not yet calibrated. If, in an imaginary manner, we complete the circumferential regions of the sectioned workpiece 1 omitted in the section, the embodiment shown of the workpiece 1 thus has three desired deformation faces 4.

FIG. 2 shows the centering region 2 of FIG. 1 (as well as on account of another cutting plane also half of a further centering region 2) at the start of the calibrating operation. It can be seen that the desired deformation face 4 has already been slightly forged/reduced; that is the tip of the desired deformation face 4 projecting into the centering region 2 has already been adapted to the contour of the centering region 2 by a calibrating tool (not shown) being introduced into the centering region or the center 2.

In FIG. 3, the workpiece 1 is shown with a lightly calibrated desired deformation face 4. A workpiece 1 of this type can correspond to a short workpiece 1; that is a workpiece 1 which when forming the workpiece geometry has a short length within the tolerance range brought about by the method, material or tool. In order to balance out the strong compression of the workpiece 1, the desired deformation face 4 is only lightly calibrated such that the comparatively short distance between the outside surfaces 6 of the centering regions 2 is balanced out by desired deformation faces 4 which extend in the longitudinal direction of the workpiece 1 away from the outside surfaces 6 as a contact face for the machining between centers. As the calibrating tool 20 moves into a fixed end position, the desired deformation face 4, on account of the overall short length of the workpiece 1, is automatically only slightly adapted, and consequently is adjusted precisely to the desired measurement. This is explained by the distance between the calibrating tools 20 in a fixed end position preferably always being the same such that a forging/reducing of the desired deformation face 4 beyond the desired measurement is reliably avoided.

In FIG. 4 the workpiece 1 is shown with a heavily calibrated desired deformation face 4. A workpiece 1 of this type can correspond to a long workpiece 1; that is a workpiece 1 which, when forming the workpiece geometry, has a long length within the tolerance range brought about by the method, material or tool. In order to balance out a comparatively small deformation of the workpiece 1 when viewed in the longitudinal direction L of the workpiece 1, the desired deformation face is heavily calibrated or compared to FIG. 3 more heavily calibrated. In this way, the small difference between the outside surfaces 6 of the centering regions 2, which are spaced comparatively far apart, and the predetermined desired measurement for the distance between the contact faces of the centering regions 2 for the machining between centers is balanced out by the desired deformation faces 4 which balance out the difference and extend only to a small extent from the outside surface 6 in the longitudinal direction L of the workpiece 1. The achieving of the desired measurement is therefore automatically achieved by a fixed end position of the calibrating tool 20; irrespective of whether a short or long workpiece 1 is present lying within the tolerance range with reference to the forming of the workpiece geometry.

In order to be able to adjust the workpieces 1, in particular the distance between the contact faces of the centering regions 2, in all cases within a predetermined tolerance range, the desired deformation faces 4 should preferably be realized in such a manner that they are also able to balance out a length fluctuation of the workpiece 1 and of the distances between the contact faces of the centering regions 2 within said tolerance range. The desired deformation faces 4 therefore have to be dimensioned in such a manner that they extend so far right into the centering region or the center 2 that they always experience forging/reducing during the calibrating operation. If, during a calibrating operation therefore either the desired deformation face 4 is not forged at all or is forged in such a manner that additionally the entire workpiece 1 is compressed over the centering base face 6 (for example outer surface), it can be established immediately as a result that the workpiece 1 is scrap.

The invention is not limited to the aforementioned exemplary embodiments as long as it is included by the object of the following claims. Thus, the invention is not, for example, limited to a certain geometric development or dimensioning of the centering region or of the center 2 or of the desired deformation face 4. Neither are the methods for forming the workpiece geometry limited to forging methods. Likewise, the methods for calibrating the desired deformation face 4 are not limited by the invention as long as they allow an adapting of the same preferably in the longitudinal direction L of the workpiece 1.

The invention claimed is:

1. A method for producing a workpiece from an elongated blank or intermediate product, said method comprising the following steps:
    forming a workpiece geometry, wherein a centering region for a subsequent machining of the workpiece between centers is introduced in each of two oppositely situated sides of the workpiece with reference to a longitudinal axis thereof, and wherein at least one of the centering regions has a desired deformation face, and
    calibrating the workpiece by forging only the desired deformation face to reduce a distance between contact faces of the centering regions for the machining between centers to a predetermined desired measurement.

2. The method as claimed in claim 1, wherein at least one of the centering regions is a center, or wherein at least one of the centering regions is formed by inner wall regions of the workpiece which taper toward the respective other centering region or by parts thereof.

3. The method as claimed in claim 2, wherein at least one of the centering regions is a center having a cone-shaped recess.

4. The method as claimed in claim 3, wherein an outer surface of the cone-shaped recess encloses an angle of 60°.

5. The method as claimed in claim 2, wherein at least one of the centering regions is formed by inner wall regions of the workpiece which taper toward the respective other centering region or by parts thereof wherein the inner wall regions enclose an angle of 60°.

6. The method as claimed in claim 5, wherein the angle of 60° is 30° of each inner wall region with respect to the longitudinal axis of the workpiece.

7. The method as claimed in claim 1, wherein the desired deformation face is formed in such a manner that it extends right into the centering region or the center as a three-dimensional shaped elevation.

8. The method as claimed in claim 7, wherein the three-dimensional shaped elevation comprises at least three convex shaped elevations.

9. The method as claimed in claim 8, wherein the convex shaped elevations comprise point-focal or elongated shaped elevations.

10. The method as claimed in claim 8, wherein the convex shaped elevations are uniformly distributed over a circumference of the centering region.

11. The method as claimed in claim 10, wherein the elevations are hemispherical or cone-shaped shaped elevations.

12. The method as claimed in claim 7, wherein the three-dimensional shaped elevation comprises at least one shaped elevation which extends over at least part of a circumference of the centering region.

13. The method as claimed in claim 12, wherein the three-dimensional shaped elevation has at least one substantially ring-shaped or hose-shaped shaped elevation which extends over at least part of the circumference of the centering region.

14. The method as claimed in claim 1, comprising, during the calibrating operation, forging the desired deformation face by introducing a calibrating tool which corresponds substantially to the centering region except for the desired deformation face.

15. The method as claimed in claim 14, comprising calibrating the workpiece by introducing the calibrating tool into the centering region in the longitudinal direction of the workpiece.

16. The method as claimed in claim 14, wherein in a fixed end position of the calibrating tool during the calibrating operation, the distance between the contact faces of the centering regions of the workpiece for the machining between centers corresponds to the predetermined desired measurement.

17. The method as claimed in claim 14, comprising introducing two calibrating tools corresponding with the centering regions into the centering regions in a longitudinal direction of the workpiece and moving the calibrating tools in relation to each other such that the distance between the calibrating tools in a fixed end position during the calibrating operation corresponds to the desired measurement of the distance between the contact faces of the centering regions of the workpiece for the machining between centers.

18. The method as claimed in claim 1, comprising reducing the length tolerance between the contact faces of the centering regions for the machining between centers to +/−0.25 mm by the calibrating operation.

19. The method as claimed in claim 18, comprising reducing the length tolerance between the contact faces of the centering regions for the machining between centers to +/−0.1 mm by the calibrating operation.

20. The method as claimed in claim 1, comprising forming the workpiece geometry by at least one of cold-forging, warm-forging, and hot-forging.

21. The method as claimed in claim 1, wherein calibrating comprises at least one of cold-forging, warm-forging, and or hot-forging.

22. The method as claimed in claim 1 wherein the workpiece geometry is formed by forging the blank or intermediate product.

23. The method as claimed in claim 1, wherein each of the contact faces is a face of the centering region at which, during machining between centers, the centers engage in the centering region and clamp the workpiece and, if deformation faces are provided in the centering region, the contact face is formed by the face of the deformation face facing the centering region.

24. A workpiece produced from an elongated blank or intermediate product, wherein the workpiece has a centering region for machining between centers on each of two oppositely situated sides with reference to a longitudinal axis of the workpiece, wherein at least one of the centering regions has at least one desired deformation face, wherein the desired deformation face has at least one three-dimensional shaped elevation which extends right into the centering region or the center, wherein the three-dimensional shaped elevation has at least two convex-shaped hemispherical shaped elevations or cone-shaped shaped elevations, and wherein the three-dimensional shaped elevation provides a sufficient support surface for the centers for machining between centers and makes it possible at the same time to center the workpiece.

25. The workpiece as claimed in claim 24, wherein at least one of the centering regions is a center, or wherein at least one of the centering regions is formed by inner wall regions of the workpiece which taper toward a respective other centering region or by parts thereof.

26. The workpiece as claimed in claim 25, wherein at least one of the centering regions is a center having a cone-shaped recess.

27. The workpiece as claimed in claim 26, wherein an outer surface of the cone-shaped recess encloses an angle of 60°.

28. The workpiece as claimed in claim 25, wherein at least one of the centering regions is formed by inner wall regions of the workpiece which taper toward a respective other centering region or by parts thereof wherein the inner wall regions enclose an angle of 60°.

29. The workpiece as claimed in claim 28, wherein the angle of 60° is 30° of each inner wall region with respect to the longitudinal axis of the workpiece.

30. The workpiece as claimed in claim 24, wherein the three-dimensional shaped elevation has at least three convex-shaped elevations.

31. The workpiece as claimed in claim 24, wherein the convex shaped elevations comprise point-focal shaped elevations.

32. The workpiece as claimed in claim 24, wherein the convex shaped elevations are uniformly distributed over the circumference of the centering region.

33. The workpiece as claimed in claim 24, wherein each of the contact faces is a face of the centering region at which, during machining between centers, the centers engage in the centering region and clamp the workpiece and, if deformation faces are provided in the centering region, the contact face is formed by the face of the deformation face facing the centering region.

* * * * *